W. A. SNOW.
Improvement in Dough-Kneaders and Rollers.
No. 128,333. Patented June 25, 1872.
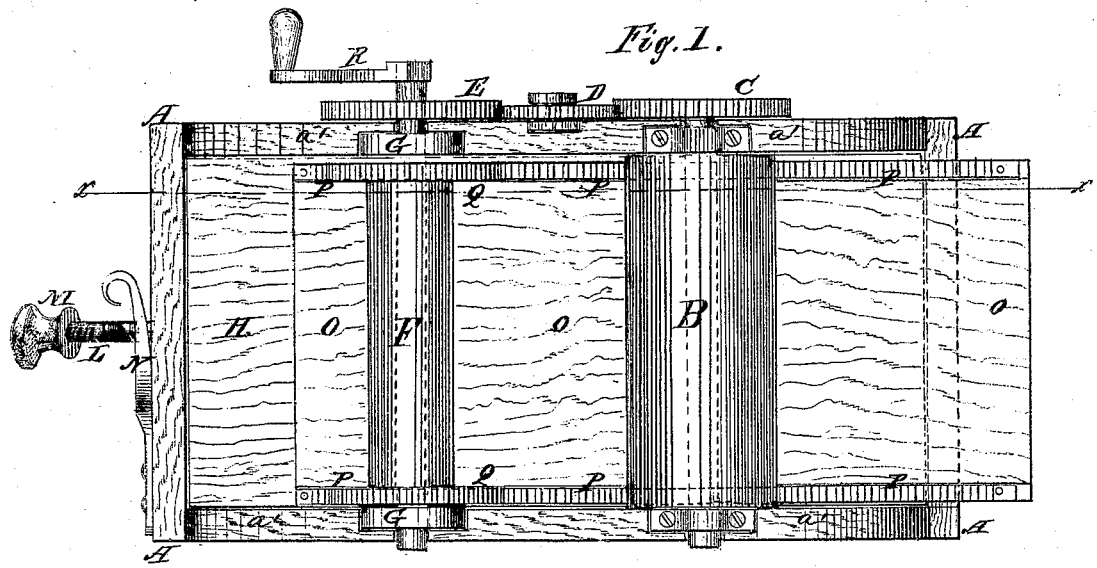
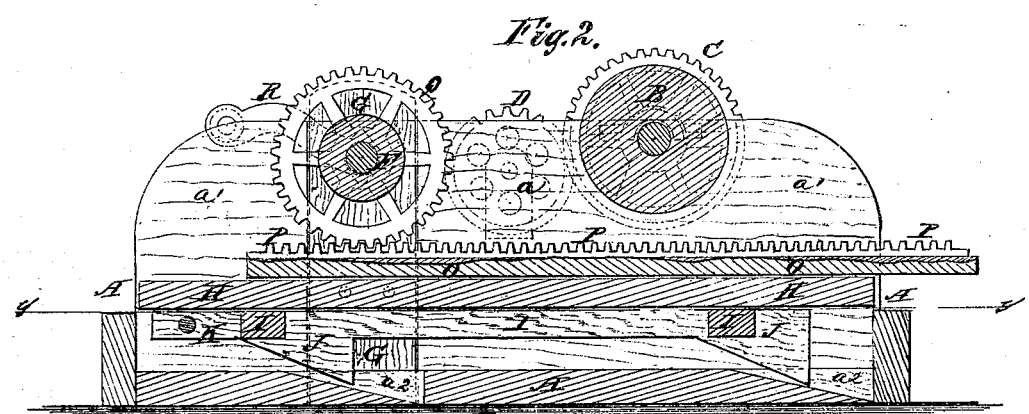
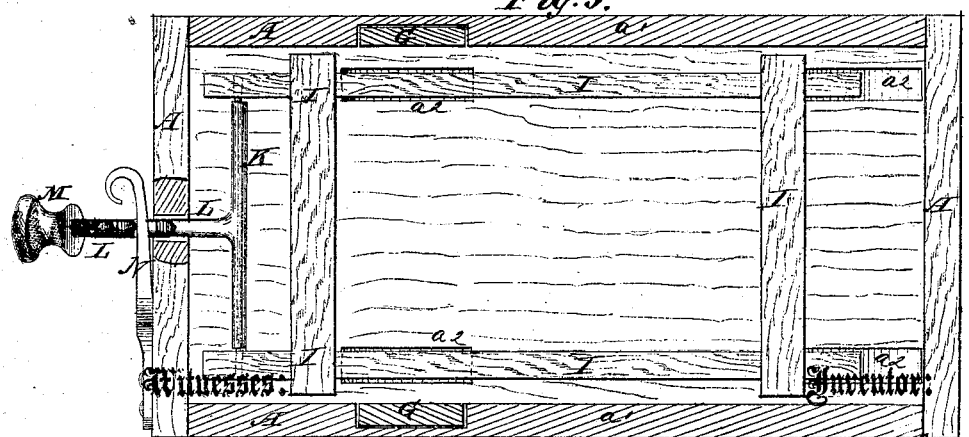

UNITED STATES PATENT OFFICE.

WASHINGTON A. SNOW, OF KILLINGWORTH, CONNECTICUT.

IMPROVEMENT IN DOUGH KNEADERS AND ROLLERS.

Specification forming part of Letters Patent No. 128,333, dated June 25, 1872.

Specification describing a new and Improved Dough Kneader and Roller, invented by WASHINGTON A. SNOW, of Killingworth, in the county of Middlesex and State of Connecticut.

Figure 1 is a top view of my improved machine. Fig. 2 is a detail vertical longitudinal section of the same taken through the line $x\,x$ of Fig. 1. Fig. 3 is a detail horizontal section of the same taken through the line $y\,y$, Fig. 2.

Similar letters of reference indicate corresponding parts.

My invention has for its object to furnish an improved machine for kneading and rolling dough, which shall be simple in construction, convenient in use, and effective in operation, being easily adjusted to roll the dough thick or thin, as may be required; and it consists in the construction and combination of the various parts of the machine, as hereinafter more fully described.

A represents a shallow rectangular box, the side boards $a'$ of which project above the end boards, as shown in Fig. 2. To the upper edges of the side boards $a'$, toward their rear ends, are attached bearings, in which revolve the journals of the large roller B. To the projecting end of one of the journals of the roller B is attached a gear-wheel, C, the teeth of which mesh into the teeth of an intermediate gear-wheel, D, pivoted to the side board $a'$ of the box A, and the teeth of which mesh into the teeth of the gear-wheel E attached to the projecting end of one of the journals of the small roller F. The journals of the small roller F revolve in uprights G, which slide up and down in grooves in the inner sides of the side boards $a'$ of the box A, and are securely attached to the side edges of the board or platform H, which rests upon the frame I. The frame I is placed in the lower part of the box A, and to the under side of the forward and rear parts of its side-bars are attached inclined blocks J, which enter inclined grooves or notches $a^2$ in the bottom of the box A. By this construction, by drawing the frame I forward the board H, and with it the standards G and roller F, will be raised, bringing the board H closer to the large roller B, and by pushing the said frame to the rearward the said board, uprights, and roller will be lowered, increasing the distance between the said board H and roller B. This adjustment enables the dough to be rolled thick or thin, as may be desired. To the forward end of the frame I is pivoted a cross-bar or round, K, to the center of which is attached an arm, L, which projects through a slot or hole in the forward-end board of the box A, and has a knob or other handle attached to it for convenience in operating the frame I. The frame I is held in any position into which it may be adjusted by a spring catch, N, attached to the end of the box A, and which takes hold of notches formed for that purpose in the arm L, as shown in Figs. 1 and 3. O is the kneading-board, which rests and slides upon the board or platform H, and to the side edges of the upper side of which are attached toothed bars P, into the teeth of which mesh the teeth of the gear-wheels Q attached to the ends of the roller F, or to the journals of said roller at the inner sides of the uprights G. To one of the journals of the roller F is attached a crank, R, by which the machine is operated.

The dough to be kneaded and rolled is placed upon the kneading-board O, which is then moved back and forth upon the board or platform H by the gearing, the thinness to which the dough is to be rolled being adjusted by regulating the frame I, as hereinbefore described.

Having thus described my invention, I claim as new and desire to secure by Letters Patent—

An improved dough kneader and roller, formed by the combination of the box A, large roller B, gear-wheels C D E, small roller F, uprights G, platform H, adjustable frame I J, adjusting-arm L, kneading-board O, rack-bars P, gear-wheels Q, and crank R with each other, substantially as herein shown and described, said parts being constructed and operating as and for the purposes set forth.

WASHINGTON A. SNOW.

Witnesses:
ORLANDO E. REDFIELD,
ELIZA G. REDFIELD.